US010318137B2

(12) United States Patent
Fish et al.

(10) Patent No.: US 10,318,137 B2
(45) Date of Patent: Jun. 11, 2019

(54) MULTI-MODAL PARTICIPANT LISTS

(71) Applicant: GOOGLE LLC, Mountain View, CA (US)

(72) Inventors: Edmund J. Fish, Great Falls, VA (US); Allen J. Eichler, Waterford, VA (US)

(73) Assignee: Google LLC, Mountain View, CA (US)

( * ) Notice: Subject to any disclaimer, the term of this patent is extended or adjusted under 35 U.S.C. 154(b) by 286 days.

(21) Appl. No.: 15/444,195

(22) Filed: Feb. 27, 2017

(65) Prior Publication Data
US 2017/0168700 A1    Jun. 15, 2017

Related U.S. Application Data

(63) Continuation of application No. 14/449,240, filed on Aug. 1, 2014, now Pat. No. 9,584,448, which is a continuation of application No. 13/240,911, filed on Sep. 22, 2011, now Pat. No. 8,819,153, which is a continuation of application No. 11/017,205, filed on Dec. 21, 2004, now Pat. No. 8,037,139.

(51) Int. Cl.
| | |
|---|---|
| *G06F 15/16* | (2006.01) |
| *G06F 3/0484* | (2013.01) |
| *A63F 13/87* | (2014.01) |
| *A63F 13/795* | (2014.01) |
| *H04L 12/58* | (2006.01) |
| *G06F 3/0482* | (2013.01) |

(52) U.S. Cl.
CPC ........ *G06F 3/04847* (2013.01); *A63F 13/795* (2014.09); *A63F 13/87* (2014.09); *G06F 3/0482* (2013.01); *H04L 51/04* (2013.01); *H04L 51/26* (2013.01); *H04L 51/36* (2013.01); *A63F 2300/556* (2013.01); *A63F 2300/572* (2013.01)

(58) Field of Classification Search
CPC .. G06F 3/04847; G06F 3/0482; A63F 13/795; A63F 13/87; A63F 2300/556; A63F 2300/572; H04L 51/04; H04L 51/26; H04L 51/36
USPC ........................................................ 709/204
See application file for complete search history.

(56) References Cited

U.S. PATENT DOCUMENTS

| | | |
|---|---|---|
| 5,971,854 A | 10/1999 | Pearson |
| 6,559,194 B2 | 5/2003 | Malwitz |

(Continued)

OTHER PUBLICATIONS

Old Yank's Unofficial Guide to Yahoo! Bridge. <http://web.archive.org/web/20021206081528/http://www.geocities.com/oldyankl/yahoo.html>, Dec. 2, 2002, 4 Pages.

(Continued)

*Primary Examiner* — Kristie D Shingles
(74) *Attorney, Agent, or Firm* — IP Spring

(57) ABSTRACT

An instant messaging user may use a buddy list that includes a user-selected list of potential instant messaging recipients ("buddies") to identify another instant messaging user with whom instant messages are to be exchanged. An instant messaging user also may use a buddy list for other purposes, such as to initiate playing of an on-line game or to invite participants to play an on-line game. Techniques are provided to transform a buddy list from one messaging-mode to another messaging-mode. The transformation may include, for example, substitution or re-ordering of groups of buddies, substitution of buddy icons associated with buddies, substitution of information displayed about buddies, and substitution of controls for directing operation of the buddy list.

20 Claims, 7 Drawing Sheets

(56) References Cited

U.S. PATENT DOCUMENTS

| | | |
|---|---|---|
| 6,676,521 B1 | 1/2004 | La Mura |
| 6,699,125 B2 | 3/2004 | Kirmse |
| 6,908,389 B1 | 6/2005 | Puskala |
| 6,993,555 B2 | 1/2006 | Kay et al. |
| 7,043,530 B2 | 5/2006 | Isaacs et al. |
| 7,117,445 B2 | 10/2006 | Berger |
| 7,158,798 B2 | 1/2007 | Lee |
| 7,162,236 B2 | 1/2007 | Dorenbosch et al. |
| 7,168,089 B2 | 1/2007 | Nguyen et al. |
| 7,185,059 B2 | 2/2007 | Daniell et al. |
| 7,194,004 B1 | 3/2007 | Thomsen |
| 7,215,760 B2 | 5/2007 | Lenard |
| 7,222,171 B2 | 5/2007 | Fukumoto et al. |
| 7,231,229 B1 | 6/2007 | Hawkins et al. |
| 7,240,093 B1 | 7/2007 | Danieli |
| 7,275,215 B2 | 9/2007 | Werndorfer et al. |
| 7,311,608 B1 | 12/2007 | Danieli et al. |
| 7,313,760 B2 | 12/2007 | Grossman et al. |
| 7,321,969 B2 | 1/2008 | Schoen et al. |
| 7,382,868 B2 | 6/2008 | Moore et al. |
| 7,412,040 B2 | 8/2008 | Koch |
| 7,444,599 B1 | 10/2008 | Chaudhri et al. |
| 7,536,206 B2 | 5/2009 | Hardy et al. |
| 7,549,924 B2 | 6/2009 | Canessa |
| 7,580,363 B2 | 8/2009 | Sorvari et al. |
| 7,664,814 B2 | 2/2010 | Little, II |
| 8,037,139 B1 | 10/2011 | Fish et al. |
| 8,819,153 B1 | 8/2014 | Fish et al. |
| 2002/0086732 A1 | 7/2002 | Kirmse |
| 2002/0144273 A1 | 10/2002 | Reto |
| 2003/0125112 A1 | 7/2003 | Silvester |
| 2003/0182420 A1 | 9/2003 | Jones et al. |
| 2003/0190960 A1 | 10/2003 | Jokipii |
| 2003/0208545 A1 | 11/2003 | Eaton et al. |
| 2003/0228908 A1 | 12/2003 | Caiafa et al. |
| 2003/0233537 A1 | 12/2003 | Wohlgemuth et al. |
| 2004/0019912 A1 | 1/2004 | Staack |
| 2004/0152517 A1 | 8/2004 | Hardisty et al. |
| 2004/0198403 A1 | 10/2004 | Pedersen |
| 2004/0224769 A1 | 11/2004 | Hansen |
| 2004/0224771 A1 | 11/2004 | Chen et al. |
| 2004/0224772 A1 | 11/2004 | Canessa |
| 2005/0182798 A1 | 8/2005 | Todd et al. |
| 2005/0202875 A1 | 9/2005 | Murphy et al. |
| 2005/0239550 A1 | 10/2005 | Hardisty et al. |
| 2006/0028983 A1 | 2/2006 | Wright |
| 2006/0031785 A1 | 2/2006 | Raciborski |
| 2006/0100006 A1 | 5/2006 | Mitchell et al. |
| 2006/0121991 A1 | 6/2006 | Borinik et al. |
| 2006/0136584 A1 | 6/2006 | Decker et al. |

OTHER PUBLICATIONS

Playing Internet Pool. <http:/web.archive.org/web/20040810213026/internetgames.about.com/library/weekly/aa012703a.htm>, Aug. 10, 2004, 3 pages.

GameSpy Arcade, Play Hundreds of Online Multiplayer Games!, Inviting people to Play a Game, http://www.gamespyarcade.com/support/help/player_match.shtml, Jan. 26, 2004, pp. 1-2.

GameSpy Arcade, Play Hundreds of Online Multiplayer Games!, Arcade Support Central, http://www.gamespyarcade.com/support/,, Mar. 26, 2004, pp. 1-2.

GameSpy Arcade, Play Hundreds of Online Multiplayer Games!, Sending Files to Another User, http://www.gamespyarcade.com/support/help/file_transfer.shtml,, Mar. 26, 2004, pp. 1-2.

GameSpy Arcade, Play Hundreds of Online Multiplayer Games!, Unique Nicknames in GameSpy Arcade, http://www.gamespyarcade.com/support/nicknames.shtml,, Mar. 26, 2004, pp. 1-2.

GameSpy Arcade, Play Hundreds of Online Multiplayer Games!, GameSpy Arcade's User Rooms, http://www.gamespyarcade.com/support/help/userrooms.shtml, Mar. 26, 2004, pp. 1-2.

GameSpy Arcade, Play Hundreds of Online Multiplayer Games!, Where You're At, http://www.gamespyarcade.com/support/help/youarehere.shtml,, Mar. 26, 2004, pp. 1-2.

GameSpy Arcade, Play Hundreds of Online Multiplayer Games!, Using Arcade's Client Side Filtering, http://www.gamespyarcade.com/support/filter.shtml,, Mar. 26, 2004, pp. 1-3.

GameSpy Arcade, Play Hundreds of Online Multiplayer Games!, Viewing Your PlayerSpy List, http://www.gamespyarcade.com/support/help/communicate.shtml,, Mar. 26, 2004, pp. 1-3.

Pixel Technologies, Cross-Platform Game Technology description, Pixel Technologies—ITV, Mobile and PC Entertainment & Edutainment Channels, http://www.pixel-tech.com/mobileonline.html,, Mar. 26, 2004, p. 1.

Pixel Technologies, Cross-Platform Game Technology description, Pixel Technologies—ITV, Mobile and PC Entertainment & Edutainment Channels, http://www.pixel-tech.com/itvtechnology.html,, Mar. 26, 2004, pp. 1-2.

Roger Wilco Base Station, http://rogerwilco.gamespy.com/products/rwbs/index.html,, Mar. 26, 2004, pp. 1-2.

Roger Wilco Product Information, http://rogerwilco.gamespy.com/products/rw/index.html,, Mar. 26, 2014, pp. 1-2.

Sega Sports, NFL 2K3 Video Game description, http://www.football-gaming.com/sega/nfl2k3/manual/xbox/xbox-25.html Mar. 26, 2004, pp. 1-2.

Yahoo Backgammon, <http://web.archive.org/web/20060618071747/http://www.gammoned.com/yahoo-backgammon.html>, Jun. 18, 2006, 4 Pages.

MULTI-MODAL PARTICIPANT LISTS

CROSS-REFERENCE TO RELATED APPLICATIONS

This application is a continuation of U.S. application Ser. No. 14/449,240, filed Aug. 1, 2014, which in turn is a continuation of U.S. application Ser. No. 13/240,911, filed Sep. 22, 2011, now U.S. Pat. No. 8,819,153, issued Aug. 26, 2014, which in turn is a continuation of U.S. application Ser. No. 11/017,205, filed Dec. 21, 2004, now U.S. Pat. No. 8,037,139, issued Oct. 11, 2011, the disclosure of which is expressly incorporated herein by reference in its entirety.

TECHNICAL FIELD

This description relates to techniques for communicating between two communications application operators using a network of computers.

BACKGROUND

On-line services may provide users with the ability to send and receive instant messages. Instant messages may be exchanged in a private on-line conversation between two or more people who have access to an instant messaging service and who have installed communications software necessary to access and use the instant messaging service. A participant list that includes the communications identities with which a user exchanges instant messages may be displayed for the user.

SUMMARY

In one general aspect, a participant list of potential message recipients is switched from a first messaging mode to a second messaging mode. A participant list is displayed in a first messaging mode. An indication is received from a user to switch the participant list to a second messaging mode. The participant list is transformed from the first messaging mode to the second messaging mode in response to the received indication. The participant list in the second messaging mode is displayed.

Implementations may include one or more of the following features. For example, transforming a participant list may include causing the participant list displayed in the second messaging mode to include information that is not included in the participant list displayed in the first messaging mode. The participant list displayed in the first messaging mode may include participant identifiers, and transforming the participant list may include causing the participant list displayed in the second messaging mode to include one or more participant identifiers that are not included in the participant list displayed in the first messaging mode.

The participant list displayed in the first messaging mode may include participant identifiers and categories of participant identifiers such that a category is associated with one or more participant identifiers. Transforming the participant list may include causing the participant list displayed in the second messaging mode to include one or more categories that are not included in the participant list displayed in the first messaging mode. Transforming the participant list may include causing the participant list displayed in the second messaging mode to include at least one category that is not included in the participant list displayed in the first messaging mode. A participant identifier associated with the added category in the participant list displayed in the second messaging mode may be a participant identifier that is not associated with one of the categories of participant identifiers in the participant list displayed in the first messaging mode. A participant identifier associated with the added category in the participant list displayed in the second messaging mode may be a participant identifier that also is associated with one of the categories of participant identifiers in the participant list displayed in the first messaging mode.

Transforming the participant list may include causing the participant list displayed in the second messaging mode to include less information than information displayed in the first messaging mode. Transforming the participant list also may include removing one or more participant identifiers included in the participant list displayed in the first messaging mode.

The participant list may include participant identifiers and categories of participant identifiers. A category may be associated with one or more communications identities. Transforming the participant list may include reorganizing the participant list. The participant list may be reorganized such that a participant identity is removed from a first category that is associated with the participant list displayed in the first messaging mode and is added to a second category that is associated with the participant list displayed in the second messaging mode. The participant identity is associated with only the second category in the transformed participant list displayed in the second messaging mode.

The participant list may include participant identifiers and icons, where an icon is associated with a participant identifier. Transforming the participant list may include causing the participant list displayed in the second messaging mode to display a different icon that is associated with a particular participant identity in place of an icon that is associated with the particular participant identity on the participant list displayed in the first messaging mode.

A first set of information may be displayed for the particular identity in response to an indication received from a user to display information associated with a participant identity associated with the participant list displayed in a first messaging mode. A second set of information may displayed for the participant identity in response to an indication received from a user to display information associated with a participant identity associated with the participant list displayed in a first messaging mode. Elements displayed in the first set of information may be different from elements displayed in the second set of information.

An instant messaging application user interface may include a control that is operable to enable a user to switch between the participant list displayed in the first messaging mode to the participant list displayed in the second messaging mode, and where the control, when activated, provides an indication to switch the participant list to a second messaging mode.

The first messaging mode may be associated with general-purpose instant messaging communications, and the second messaging mode may be associated with special-purpose instant messaging communications. Receiving an indication from a user to switch the participant list to a second messaging mode may include receiving, from a user, an indication to perform a function associated with the special-purpose instant messaging communications. The second messaging mode may be associated with one or more on-line games. Receiving an indication from a user to switch the participant list to a second messaging mode may include receiving an indication from a user to perform a function associated with the one or more on-line games.

In another general aspect, a graphical user interface on a display device of a computer includes a first participant list display for displaying participant identifiers in a first messaging mode and a second participant list display for displaying participant identifiers in a second messaging mode. The graphical user interface includes a control operable to cause the graphical user interface to switch between the first participant list display and the second participant list display.

Implementations may include one or more of the features noted above and one or more of the following features. For example, the participant identifiers displayed in the first participant list display may be the same as the participant identifiers displayed in the second participant list display, or may include participant identifiers that are not included in the second participant list display.

The first participant list display may include categories of participant identifiers such that a category is associated with one or more participant identifiers, and the second participant list display may include categories of participant identifiers such that a category is associated with one or more participant identifiers. At least one category may be included in the first participant list display that is not included in the second participant list display.

The first participant list display may include a control that is not included in the second participant list display.

The first participant list display may include a first icon that is associated with a participant identifier, and the second participant display may include a second icon that is associated with the participant identifier. The first icon may be different from the second icon.

Implementations of the techniques discussed above may include a method or process, a system or apparatus, computer software on a computer-accessible medium, or a graphical user interface.

The details of one or more of the implementations are set forth in the accompanying drawings and description below. Other features will be apparent from the description and drawings, and from the claims.

DESCRIPTION OF THE DRAWINGS

Like reference symbols in the various drawings indicate like elements.

DETAILED DESCRIPTION

An instant messaging user may use a buddy list that includes a user-selected list of potential instant messaging recipients ("buddies") to identify another instant messaging user with whom instant messages are to be exchanged. An instant messaging user also may use a buddy list for other purposes, such as to initiate playing of an on-line game or to invite participants to play an on-line game. Techniques are provided to transform a buddy list from one messaging-mode to another messaging-mode. The transformation may include, for example, substitution or re-ordering of groups of buddies, substitution of buddy icons associated with buddies, substitution of information displayed about buddies, and substitution of controls for directing operation of the buddy list. For example, a buddy list may be transformed from a messaging mode for engaging in general-purpose instant messages with other instant messaging users to a messaging mode for a more specialized purpose, such as on-line gaming.

In one exemplary implementation, a buddy list is a user-definable list of other co-users (i.e., buddies) of an on-line or network communications systems. The buddy list enables the user to perceive presence information and changes for the co-users in a unique graphical user interface (GUI) and to track changes to presence status for the co-users automatically and in substantially real-time, where presence indicates the status of the co-user with respect to the on-line or network communications system. The buddy list also provides the user with a mechanism to initiate communications (e.g., instant messages (IMs), electronic mail (e-mail), chat, and other communications) with the co-users. A user may create separate buddy lists of co-users, either with intersecting or disjoint lists of users, and label these buddy lists according to the user's preferences or otherwise. When a user logs on to a system, the user's set of buddy lists is presented to a buddy list system. The buddy list system attempts to match co-users currently logged into the system with the entries on the user's buddy list. Any matches are displayed to the user. As co-users log on and log off, a user's buddy list is updated to reflect these changes. An indication also may be added to show that a co-user just logged on or logged off the system. In some implementations, a user account may have one or more buddy lists.

Figure 1B:
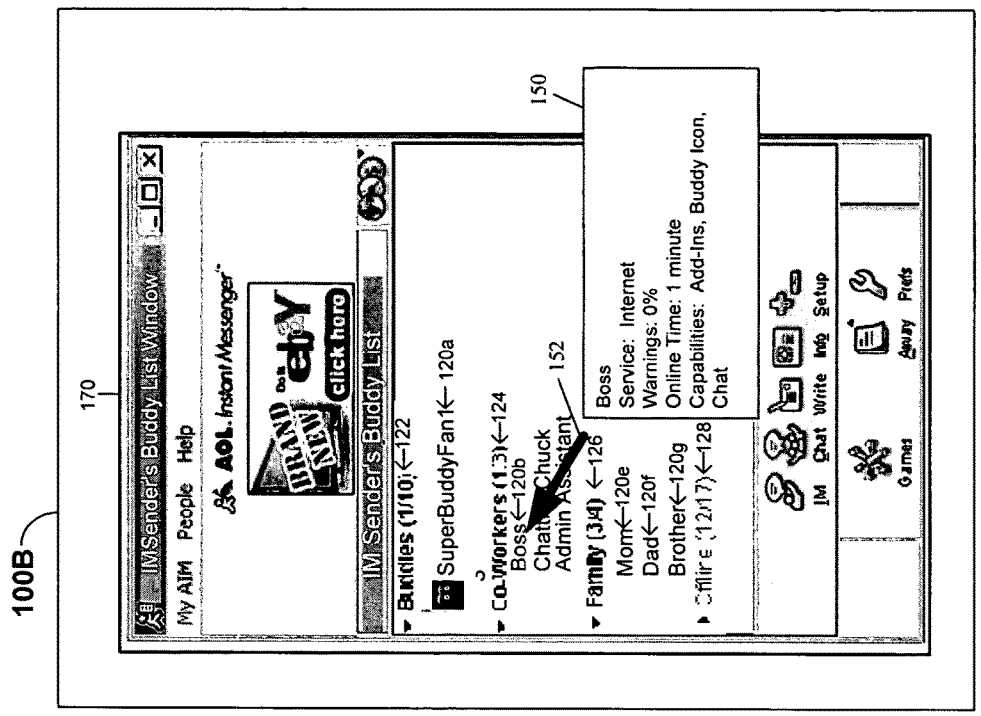
FIGS. 1A and 1B are diagrams of exemplary user interfaces for an instant message service capable of enabling a multi-modal participant list.
Figure 1A:
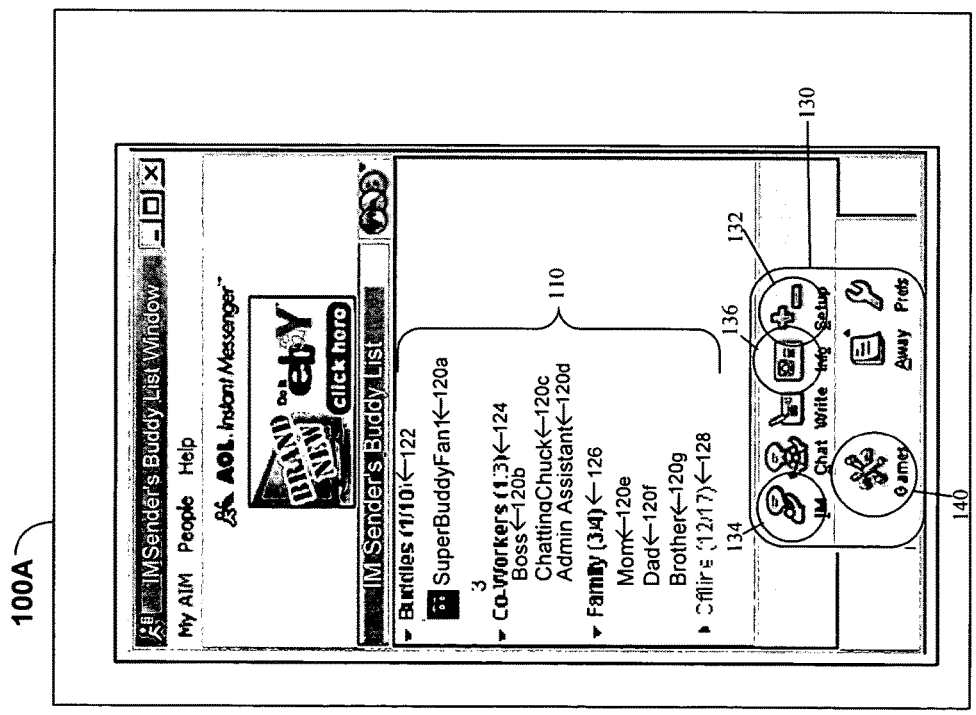

FIG. 1A illustrates an exemplary graphical user interface 100A for an instant messaging service capable of enabling a multi-modal participant list to be transformed from one messaging mode to another messaging mode. The graphical user interface 100A includes an instant message sender-selected list 110 of potential instant messaging recipients ("buddies") 120a-120g. The potential instant message recipients also may be referred to as communication participants, communication identities, instant message users, friends or contacts. For convenience, the term "buddies" is used in this description, and, as such, the graphical user interface 100A may be referred to as an instant message buddy list window 100A or, more simply, a buddy list window 100A, and the list 110 may be referred to as a buddy list 110. In some implementations, the participant list may be referred to as a contact list or a friends list. Buddies typically are contacts who are known to the potential instant message sender (here, IMSender). A buddy is identified by a screen name or other type of identifier, such as an account name, a user name, or a mobile telephone number. In particular, the user IMSender is an instant message sender using the user interface (UI) 100A. The UI 100A is rendered on the display of a computing device or a communication device on which an instant messaging client program is executed.

In the buddy list 110, the representations 120a-120g include text identifying the screen names of the buddies included in buddy list 110. However, additional or alternative information may be used to represent, and be associated with, one or more of the buddies. This additional information may include, for example, an avatar or another type of graphical image that is reduced in size and either still or animated. In one example, a buddy icon is a small, two-dimensional graphical image that may be used for self-expression by the associated buddy (e.g., used to express an interest of the buddy). A buddy icon may be a still image or animated. For example, the representation 120*a* includes the screen name and avatar of the instant message recipient named SuperBuddyFan1. For convenience, each of the representations 120*a*-120*i* may be referred to as a screen name 120*a*-120*i*. In some implementations, one or more of the representations 120*a*-120*i* may be an alias of a screen name rather than a screen name itself. The representations 120*a*-120*g* may provide connectivity information to the instant message sender about the buddy, such as whether the buddy is on-line, how long the buddy has been on-line, whether the buddy is away, or whether the buddy is available through a mobile device.

Buddies may be grouped by an instant message sender into one or more user-defined or pre-selected groupings ("groups"). As shown, the instant message buddy list window 100A has three groups, Buddies 122, Co-Workers 124, and Family 126. SuperBuddyFan1 120*a* belongs to the Buddies group 122, and ChattingChuck 120*c* belongs to the Co-Workers group 124. When a buddy's instant message client program is able to receive communications (i.e., the buddy is on-line), the representation of the buddy in the buddy list is displayed under the name or representation of the buddy group to which the buddy belongs. As shown, potential instant messaging recipients 120*a*-120*g* are on-line. In contrast, when a buddy's instant message client program is not able to receive communications (i.e., the buddy is not on-line), the representation of the buddy in the buddy list may not be displayed under the group with which it is associated. Instead, it may be displayed with representations of buddies from other groups under the heading Offline 128. All buddies included in the buddy list 110 that are displayed in the messaging mode are displayed either under one of the groups 122, 124, or 126, or under the heading Offline 128.

The buddy list window 100A also includes controls 130 that a user may use to initiate functions related to instant messaging. In particular, a setup control 132 allows for configuration of the currently displayed buddy list. Selecting the setup control 132 enables the addition and deletion of screen names, such as screen names 120*a* and 120*b*, and groups, such as groups 122 and 124, to or from the buddy list 110.

When an on-line screen name from the buddy list 110 has been selected, activating an instant messaging control 134 results in display of an interface for communicating with the account corresponding to the selected screen name. Activating the instant messaging control 134 without selecting an on-line screen name in the buddy list 110 causes the display of an interface for communicating and allows a user to identify an instant messaging user that is not on the user's buddy list. An info control 136 displays information related to a screen name selected on the buddy list 110 when such information about the buddy is available. Such information may include, for example, name, geographic location, interests and hobbies, and occupation of the buddy. In some implementations, a user may configure whether such information is displayed to other users.

The buddy list window 110 also includes a control 140 to trigger switching between the first messaging mode of the buddy list to a second messaging mode of the buddy list. In particular, the control 140 is operable to switch to the messaging mode for the buddy list window 100A to an instant messaging on-line game messaging mode, as described more fully later.

Referring also to FIG. 1B, the buddy list window 100B illustrates the display of buddy information 150 when the user moves a curser 152 over a particular screen name in the buddy list. As illustrated, the user has moved the curser 152 over the screen name 120*b*. This causes the processor to display buddy information 150 related to the screen name 120*b*. The information displayed 150 may be the same as or different from the information displayed when control 136 is activated. This may be referred to as mousing over a screen name to cause the display of buddy information.

Figure 2:
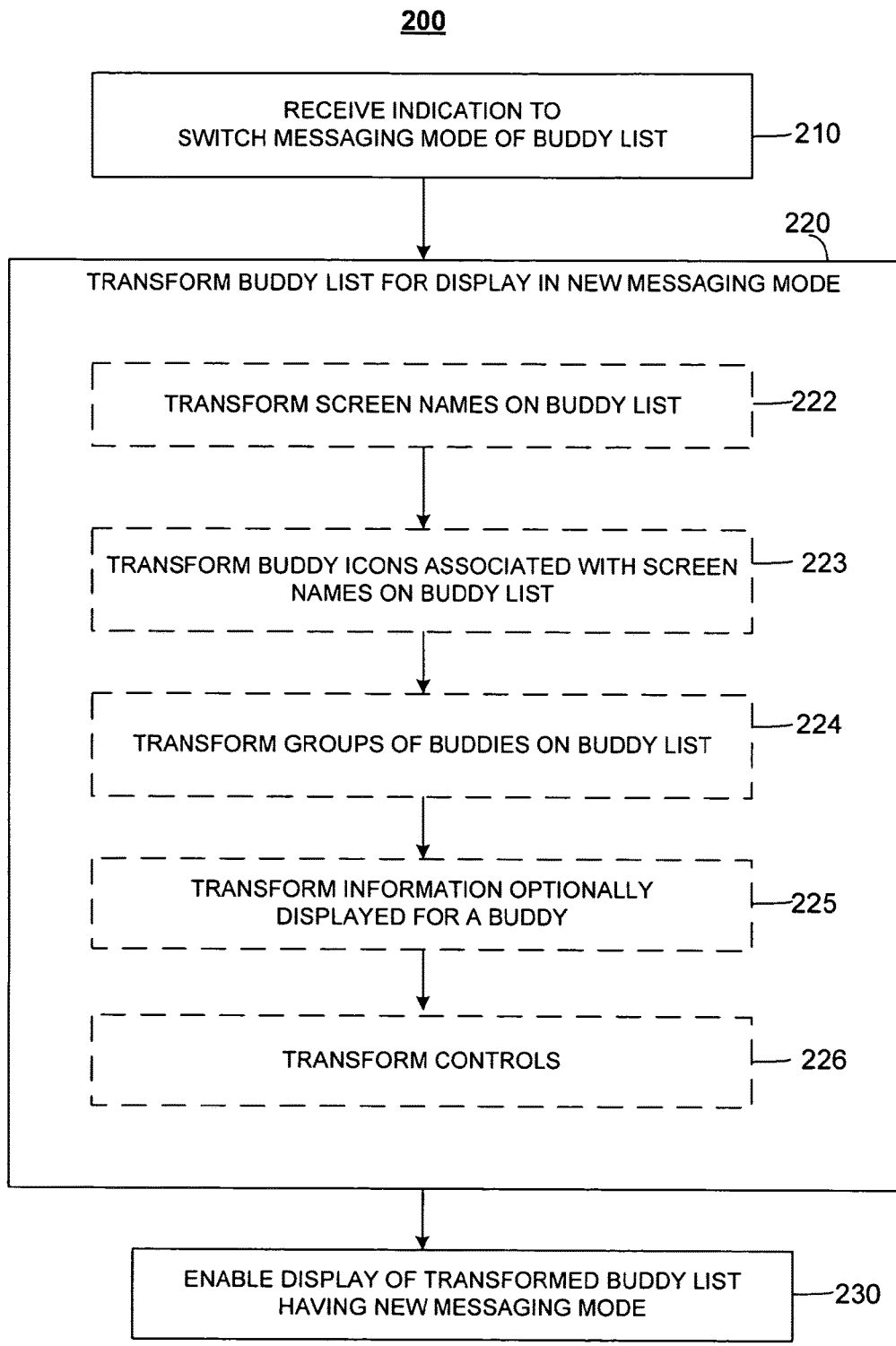
FIG. 2 is a flow chart of a process for switching a multi-modal participant list from one messaging mode to another messaging mode.

FIG. 2 illustrates a process 200 for switching a multi-modal buddy list from one messaging mode to another messaging mode. For convenience, the messaging mode from which the buddy list is transformed may be referred to as a "previous" messaging mode, and the messaging mode to which the buddy list is transformed may be referred to as a "new" messaging mode. The messaging mode for a buddy list that is displayed may be referred to as an "active" messaging mode, an "exposed" messaging mode or a "displayed" messaging mode. The process 200 may be performed, for example, by a processor of an instant messaging provider system or a processor executing a client application of an instant messaging service.

The process 200 begins when an indication to switch the messaging mode of the buddy list is received (step 210). For example, a user, who may be referred to as a sender, may activate a control to switch the display of the buddy list between the messaging modes. For example, a user may select control 140 of the buddy list window interface 100A of FIG. 1A that designates a particular messaging mode to be displayed for a buddy list. In another example, a user may select one of multiple messaging modes presented, for example, in a menu or list of options. In some implementations, a control may toggle between two messaging modes of a buddy list. A toggle control for switching messaging modes may be used, for example, when there are only two messaging modes. In another example, a toggle control may be used when there are multiple specialized messaging modes. More particularly, each one of several controls may toggle between one specialized messaging mode and a more general messaging mode. A control displayed in an on-line gaming messaging mode may toggle between the on-line gaming messaging mode and a general-purpose instant messaging mode, whereas a control displayed in an electronic commerce messaging mode may toggle between the electronic commerce messaging mode and the general-purpose messaging mode.

The processor transforms the buddy list for display in the new messaging mode (step 220). The transformation process 220 includes multiple optional sub-steps that can be performed by the processor. The processor may transform the screen names displayed on a buddy list (sub-step 222). To transform screen names on a buddy list, the processor may, for example, add a new screen name that did not appear on the buddy list in the previous messaging mode to the buddy list for display in the new messaging mode. This may be referred to as "adding" a screen name to the buddy list. The processor also may transform screen names on a buddy list by removing a screen name that was displayed in the previous message mode from display on the buddy list in the new messaging mode. This may be referred to as "deleting" or "removing" a screen name from the buddy list. In some implementations, when a first screen name is added to the buddy list and a second screen name is removed from the buddy list, the processor may be said to transform screen names by "substituting" the first (added) screen name for the second (removed) screen name.

The processor also may transform buddy icons that are displayed on the buddy list (sub-step 223). To do so, the processor may add a new buddy icon that did not appear on the buddy list in the previous messaging mode to the buddy list for display in the new messaging mode (which may be referred to as "adding" a buddy icon to the buddy list). A new buddy icon may be associated with a new screen name or may be associated with a screen name that is displayed in the buddy list in both the new messaging mode and the previous messaging mode. The processor also may transform buddy icons on a buddy list by removing a buddy icon that was displayed in the previous messaging mode from display on the buddy list in the new messaging mode (which may be referred to as "deleting" or "removing" a buddy icon from the buddy list). When a first buddy icon that is associated with a particular screen name is removed and a second buddy icon for the particular screen name is added, the second (new) buddy icon may be said to be "substituted for" or "changed to" the first (removed) buddy icon.

The processor also may transform groups of buddies on the buddy list (sub-step 224). As part of this transformation, the processor may add a new group name (e.g., the name of a group that organizes one or more buddies) that did not appear on the buddy list displayed in the previous messaging mode to the buddy list displayed in the new messaging mode. The processor also may remove a group name from the buddy list that appeared on the buddy list in the previous messaging mode. When a first group name displayed on the buddy list in the first messaging mode is removed, a second group name is added to the buddy list in the new messaging mode, and the buddies who are associated with the first group name are the same, or substantially the same, as the buddies who are associated with the second group name, the first group may be said to be "substituted for" or "changed to" the second group.

In some implementations, transforming groups also includes reorganizing screen names associated with one or more of the groups (sub-step 224). To do so, for example, when the processor continues to display a first group name displayed in the first messaging mode and adds a second group name for display on the buddy list in a second messaging mode, the processor may move one or more screen names associated with the first group name in the first messaging mode to be displayed as being associated with the second group name in the second messaging mode.

The processor also may transform the type of information to be displayed that is associated with a buddy in the second messaging mode (sub-step 225). For example, the information for a buddy that is displayed using control info, control 136 of FIG. 1, may be transformed so that additional or substitute types of information is displayed for a buddy in the new messaging mode. For example, a game interest of a buddy may be displayed in a game messaging mode and occupation of a buddy may be displayed in a general messaging mode. In some implementations, there may be no types of information that are displayed in both messaging modes. Alternatively, some, or all, of the types of information displayed may be the same in both messaging modes.

The processor also may transform controls displayed in association with a buddy list in a second messaging mode (sub-step 226). For example, a new control that allows a user to switch to a previous messaging mode or a different messaging mode may be displayed in the new messaging mode. In another example, controls that are unrelated to controlling the messaging mode also may be displayed. For example, if the new messaging mode relates to an on-line gaming mode, game controls may be displayed in the new messaging mode. The processor also may remove from display controls that are not appropriate, or no longer available to the user, in the new messaging mode. For example, a control to invite a potential participant to play a game may be removed from display in a general messaging mode or other type of messaging mode that does not relate to on-line gaming. As another example, a control that allows a user to display a shopping cart of selected items to be purchased may be displayed when switching to a messaging mode related to electronic commerce, and may be removed when switching out of the messaging mode related to electronic commerce.

After the processor transforms the buddy list for display in the new messaging mode (step 220), the processor enables the display of the transformed buddy list having the new messaging mode (step 230). This may be accomplished, for example, by displaying the transformed buddy list on a display device that is associated with the user with whom the bubby list is associated. This also may be accomplished by having the processor transmit the transformed buddy list to a client system to be displayed at the client system being used by the user with whom the buddy list is associated.

Figure 3:
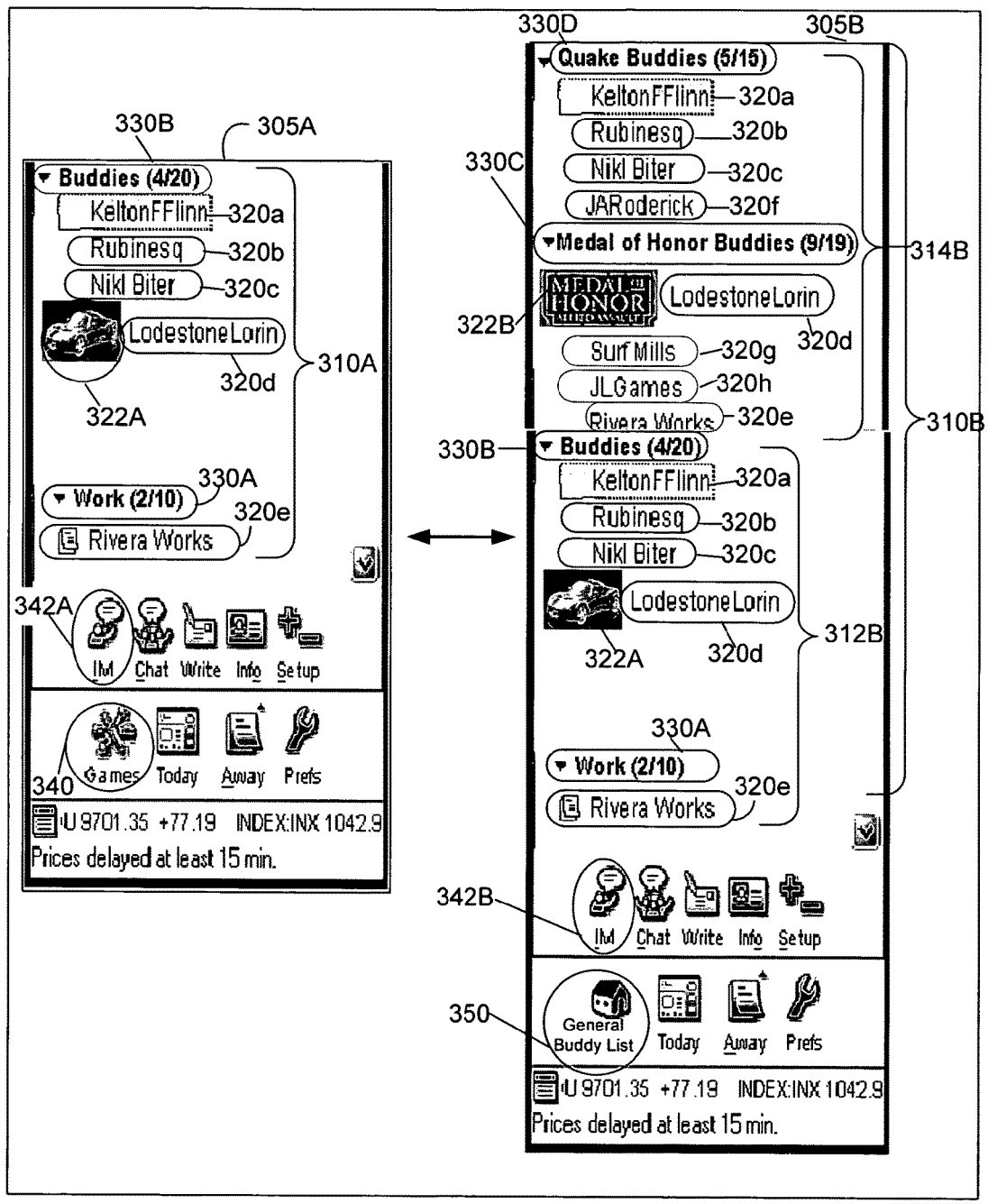
FIGS. 3-5 are diagrams of a series of user interfaces that represent the transformation of participant lists from one messaging mode to another messaging mode.

FIG. 3 shows a transformation 300 of a buddy list from one messaging mode to another messaging mode. In particular, the transformation 300 shows a buddy list window 305A having a buddy list 310A as displayed in a first messaging mode. The buddy list 310A is transformed to a buddy list 310B displayed in a buddy list window 305B in a second messaging mode. The series 300 and the transformation of the buddy list 310a from one messaging mode to the buddy list 310B representing another messaging mode for the buddy list, may be accomplished, for example, by the process 200 of FIG. 2. In the example of FIG. 3, the first messaging mode represents a general instant messaging mode, whereas the second messaging mode represents an on-line gaming mode.

More particularly, the buddy list window 305A includes the buddy list 310A having representations 320a-320e that includes text identifying a screen name of a buddy, or an alias of the screen name of a buddy, included in the buddy list 310A. For convenience, the representations may be referred to as screen names. Each screen name is associated with one of the buddy groups 330A or 330B. In addition, the screen name 320d is associated with a buddy icon 322A. The buddy list window 305A includes a control 342A to initiate an instant messaging session with one of the buddies selected in the buddy list 310A. The buddy list windows 305A also includes a control 340 for switching to the on-line gaming mode associated with the buddy list 310B.

When a user activates control 340, the buddy list 310A is transformed to the buddy list 310B for the on-line gaming mode. The transformed buddy list 310B includes a portion 314B that includes additional groups 330C and 330D and additional screen names 320f-320h.

The new group 330D includes screen names 320a-320c and 320f. One screen name (i.e., screen name 320f) associated with group 330D is new, whereas the other screen names (i.e., screen names 320a-320c) associated with the group 330D are also listed in buddy list 310A for the previous messaging mode. Similarly, the new group 330C includes some screen names (i.e., screen names 320d and 320e) that were associated with the previous messaging mode of the buddy list 310A, as well as some new screen names (i.e., screen names 320g and 320h) that are only displayed in the new messaging mode.

In buddy list 310B for the on-line gaming (new) mode, a new buddy icon 322B that is associated with the screen name 320d is displayed. A new buddy icon 322B may be used to indicate that the corresponding buddy is playing the game represented by the buddy game icon. For example, the buddy represented by the screen name 320d is shown in buddy list 310B as playing the game identified by the buddy game icon 322B. In some implementations, the buddy game icon may be operable, when activated, to enable the buddy list owner to join the game that the buddy is playing. In some implementations, a buddy game icon may be used to represent that the corresponding buddy is playing a game, in contrast to playing a particular game.

In contrast, when the screen name 320d is displayed as a member of group 330B (which was also displayed for the buddy list 310A in the general messaging mode), the buddy icon 322A is displayed adjacent to the screen name 320d.

The transformed buddy list 310B also includes a portion 312B that is the same as the buddy list 310A shown in buddy list window 305A. The portion 312B includes buddy groups 330A and 330B. As shown, the buddy game groups 330C and 330D are presented in the buddy list 310B before the presentation of buddy groups 330A and 330B that are unrelated to gaming.

A control 342A is transformed to a new control 342B to provide new functionality for the second messaging mode. Both controls 342A and 342B have the same graphical appearance. The control 342A is operable to initiate an instant messaging communication session, whereas the control 342B is operable to invite potential participants to an on-line game session using an instant messaging communication exchange. The control 350 is displayed in association with the buddy list for a second messaging mode and is operable to switch the buddy list to the general messaging (previous) mode.

Figure 4:
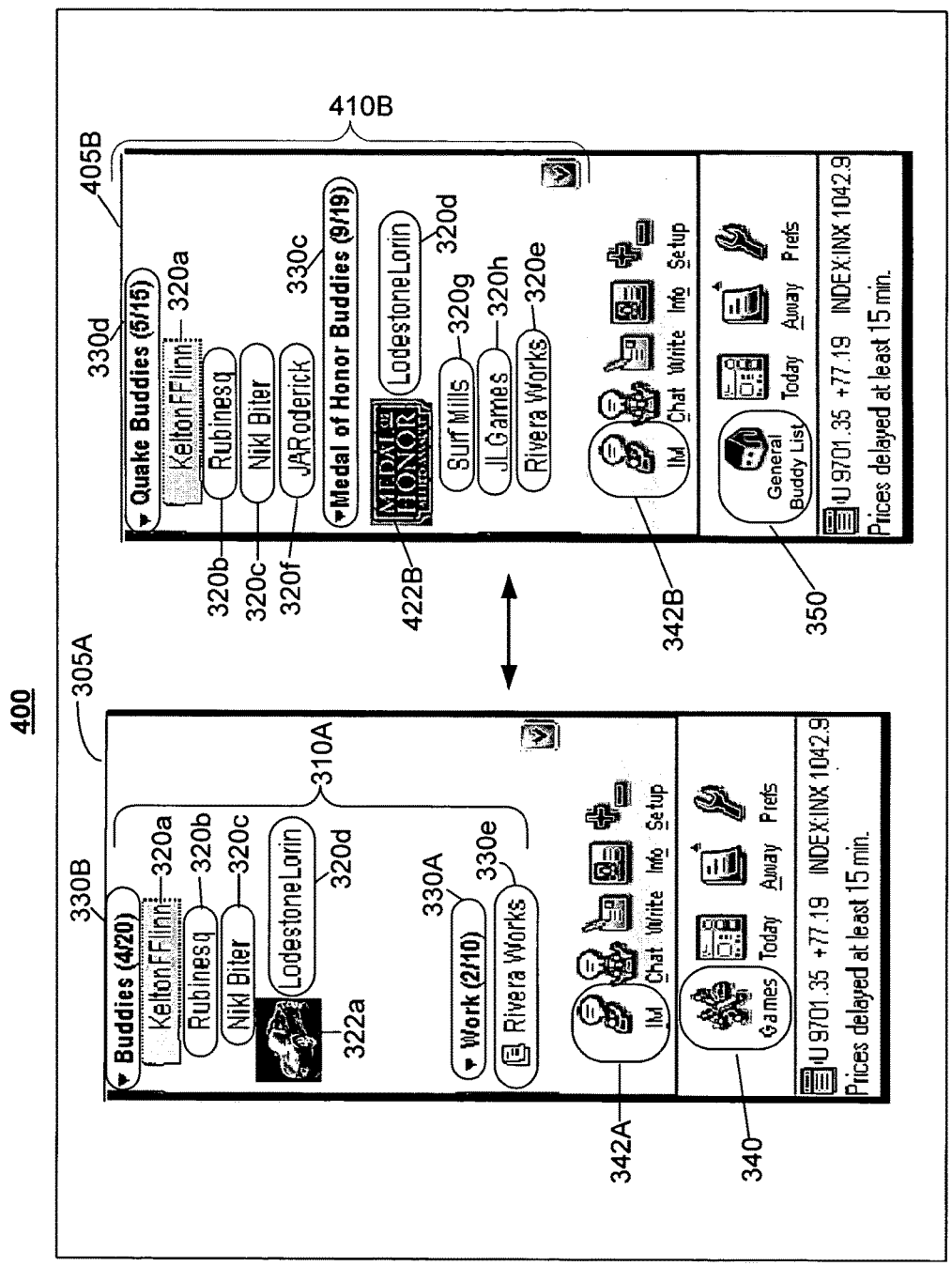

FIG. 4 depicts transformation 400 of the buddy list 310A displaying a general messaging mode to a buddy list 410B displaying an on-line gaming mode. In contrast with the transformation 300 of FIG. 3, the transformed buddy list 410B shown in buddy list window 405B does not contain a portion corresponding to previous buddy list 310A. shown in the buddy list window 305A. Rather, the buddy list 410B displaying the online gaming mode includes only game buddy groups 330C and 330D (and does not display the general buddy groups of Buddies 330B and Work 330A that are displayed in the general messaging mode). The screen name 320d associated with the game group 330C includes a new buddy icon 422B that replaces the buddy icon 332A for the screen name 320d in the buddy list 310A displayed in the general messaging mode.

Figure 5:
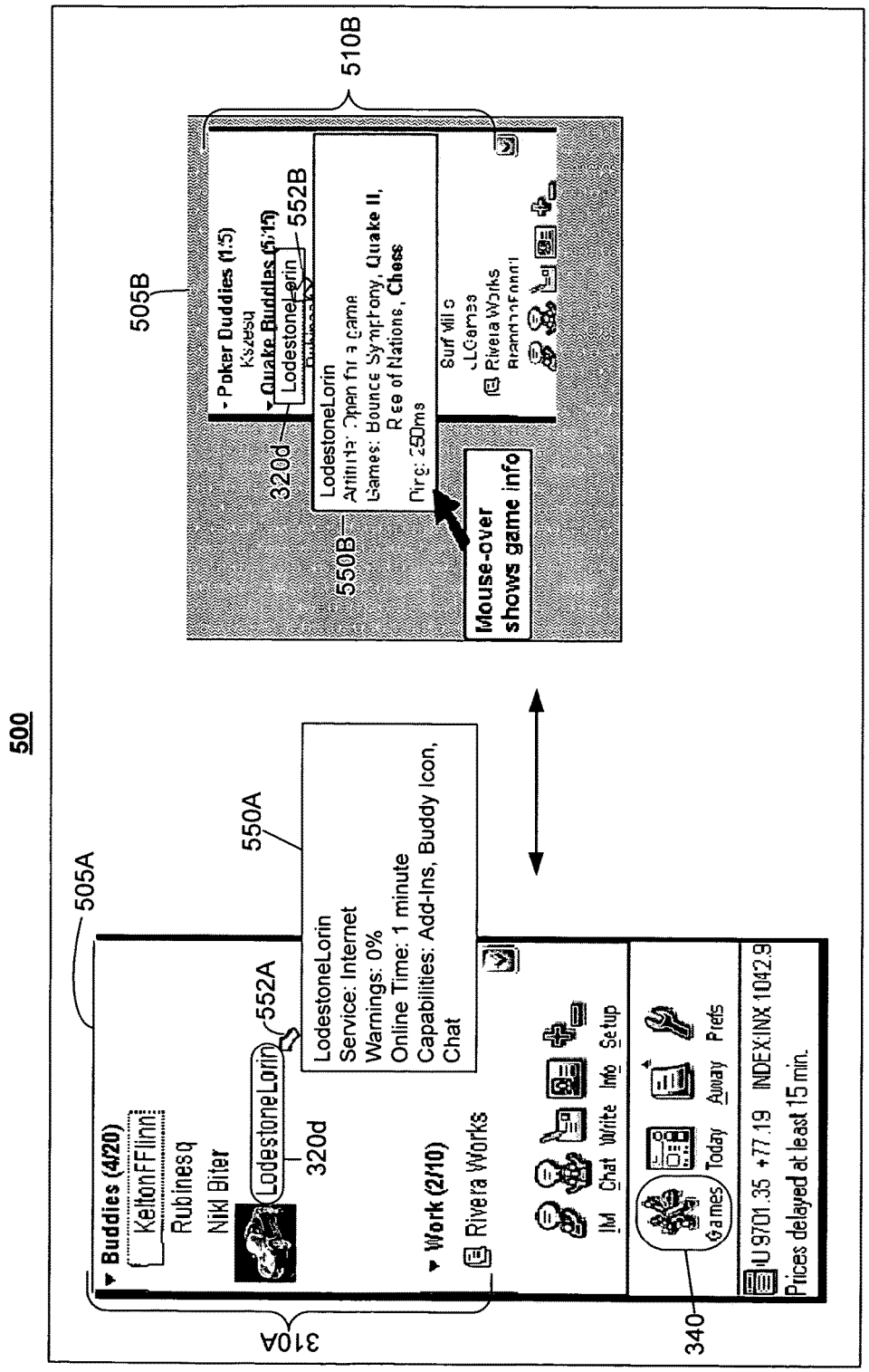

FIG. 5 illustrates a transformation 500 of types of information 550A displayed for a member (i.e., screen name 320d) of the buddy list 310A displaying a general messaging mode to types of information 550B displayed for the same member (i.e., screen name 320d) of the buddy list 510B displaying an on-line gaming mode.

More particularly, the buddy list window 505A shows buddy information 550A when a user moves a cursor 552A over a screen name 320d in the buddy list 310A in a general messaging mode. The types of information 550A include the screen name, type of service, amount of time the identity has been on-line, and general messaging capabilities (i.e., add-ins, buddy icon, chat). The buddy list window 505B shows buddy information 550B when the user moves a cursor 552B over the screen name 320d in the buddy list 510B in the on-line gaming mode. The types of information 550B include the screen name as well as types of information related to on-line gaming, such as whether the user is willing to play a game ("Open for a Game") or other types of status information or game "attitude" information. The game information 550B also includes the games that the screen name 320d is interested in playing or able to play (i.e., Bounce Symphony, Quake II, Rise of Nations, and Chess).

Figure 6:
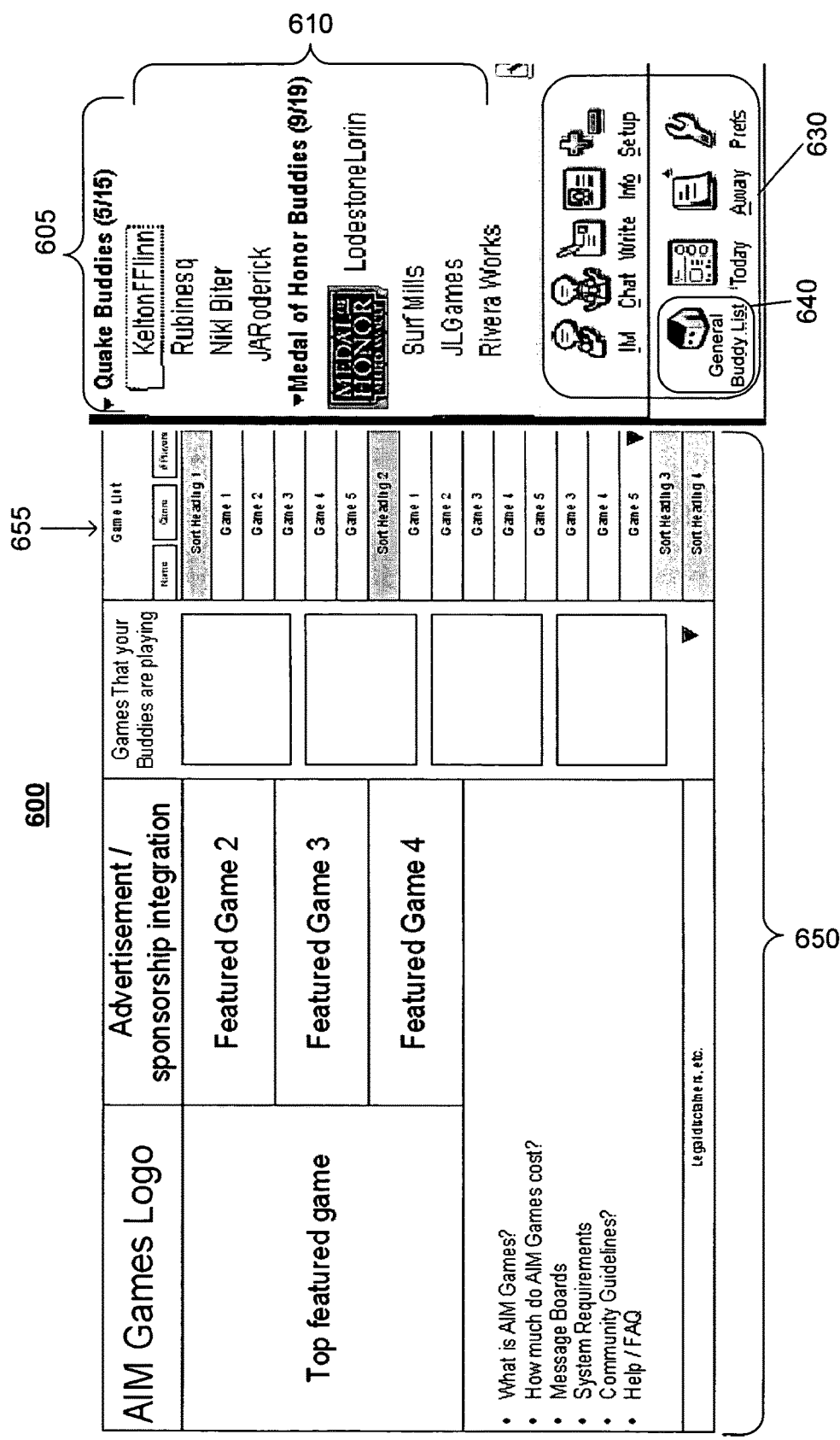
FIG. 6 is a diagram of an exemplary user interface for one mode of a multi-modal participant list.

FIG. 6 illustrates a user interface 600 that displays another exemplary illustration of a buddy list displaying an on-line gaming mode. The user interface 600 includes a buddy list portion 605 and a game portion 650. The buddy list portion 605 includes a buddy list 610 and associated controls 630. A control 640 enables transforming of the buddy list to display of a general messaging mode. The game portion 650 includes a control 655 for choosing one of multiple possible games that are sorted by game categories.

Figure 7:
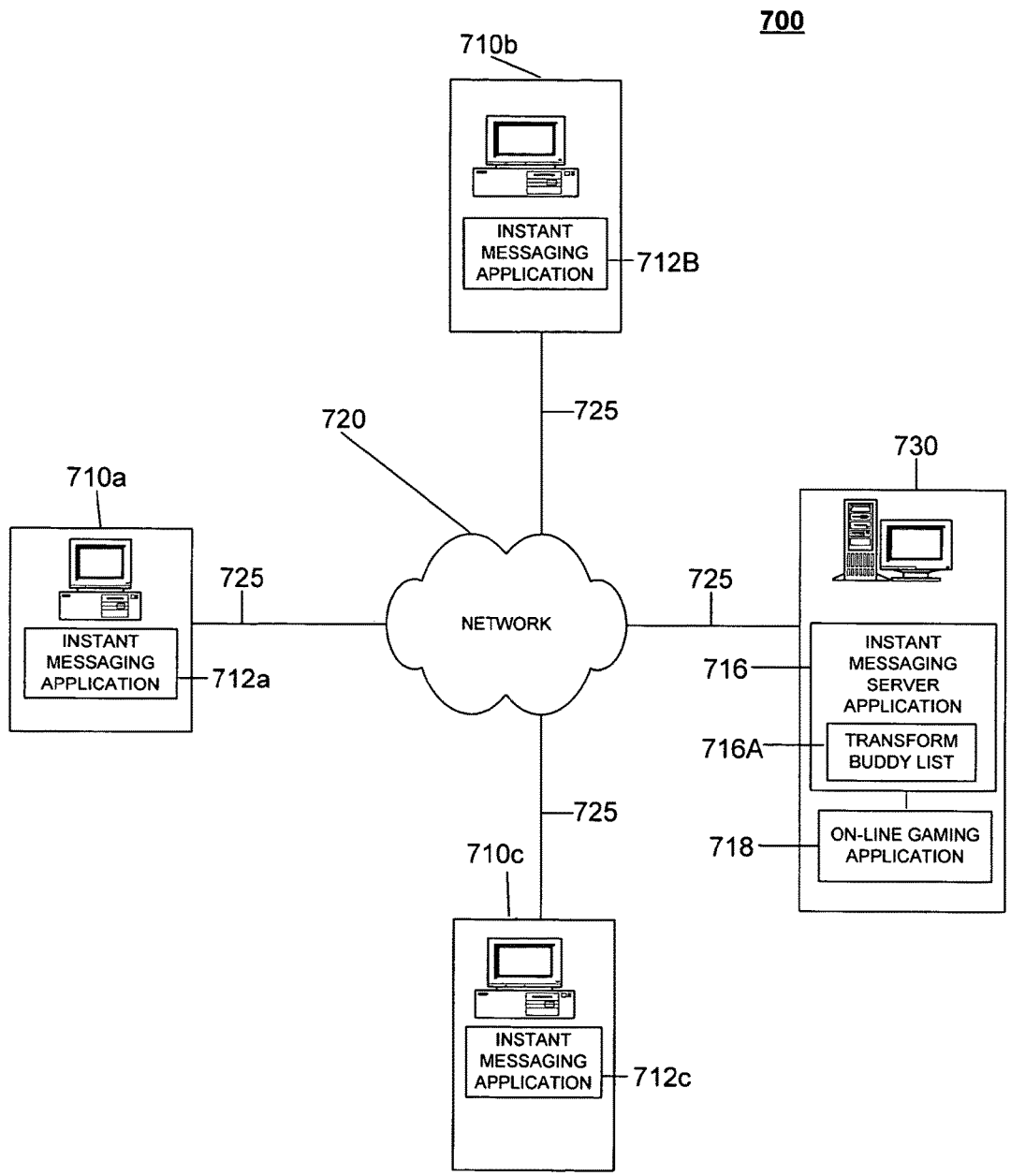
FIG. 7 is a block diagram of a networked computing environment for instant messaging that is capable of enabling a multi-modal participant list.

Referring to FIG. 7, a networked computing environment 700 supports communications between computer users. The networked computing environment 700 may be used to send and receive instant messages. Users of the networked computing environment 700 are distributed geographically and communicate using client systems 710a-710c. The client systems 710a-710c are shown as including, respectively, instant messaging applications 712a-712c. A network 720 interconnects the client systems 710a-710c. The client systems 710a-710c are connected to network 720 through various communication paths 725, such as a modem connected to a telephone line using, for example, serial line internet protocol (SLIP) or point-to-point protocol (PPP) or a direct network connection using, for example, transmission control protocol/internet protocol (TCP/IP). An instant messaging provider system 730 also may be connected to the network 720 and may be used to facilitate some direct or indirect communications between the client systems 710a-710c. The provider system 730 includes an instant messaging server application 716 and an on-line game application 718.

Each of the client systems 710a-710c and the provider system 730 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 710a-710c or the provider system 730 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 710a-710c and the provider system 730. For instance, such communications programs may include e-mail programs, instant messaging programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 710a-710c or the provider system 730.

Each of the client systems 710a-710c and the provider system 730 includes a communications interface (not shown) used by the communications programs to send communications through network 720. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer.

The network 720 typically includes a series of portals interconnected through a coherent system. Examples of the network 720 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a type of a Digital Subscriber Line (DSL)), or any other wired or wireless network. The network 720 may include multiple networks or sub-networks, each of which may include, for example, a wired or wireless data pathway.

The instant messaging applications 712a-712c include multi-modal buddy lists that may be selectively displayed in multiple messaging modes. More particularly, the instant messaging applications 712a-712c include a buddy list for each user that uses the client systems 710a-710c to send and receive instant messages. The instant messaging applications 712a-712c enable the users to send and receive instant messages with the client systems 710a-710c. Instant messages are sent between users of the client systems 710a-710c through the instant messaging server application 716 on the provider system 730. The instant messaging server application 716 routes instant messages sent with the instant messaging applications 712a-712c.

The provider system 730 also includes an on-line game application 718 to which participants may be invited using a buddy list. The provider system 730 includes code segments 716A operable to transform the display of a buddy list from one messaging mode to another messaging mode. In particular, the code segments 716A enable a buddy list to be transformed from a general instant messaging buddy list to a buddy list structured and arranged to be suitable for use with the on-line game application 718.

As would be recognized by one of ordinary skill in the art, the networked computing environment 700 may be structured and arranged differently. For example, the on-line game application 618 may be operated on a server other than the server on which the instant messaging server application 616 operates.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America On-line Instant Messenger), AOL (America On-line) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and on-line applications. For example, the techniques and concepts may be applied to an animated avatar that acts as an information assistant to convey news, weather, and other information to a user of a computer system or a computing device.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

In addition, although the examples above are given in an instant message context, other communications systems with similar attributes may be used. For example, a participant list may be used in a chat room, in electronic mail (e-mail) communications, and text messaging between voice-enabled devices, such as messaging enabled through Short Message Service (SMS) text messaging. Also, the user interface may be a viewable interface, an audible interface, a tactile interface, or a combination of these.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method to display a participant list of message recipients in different messaging modes, the method comprising:

displaying a participant list in a first messaging mode, wherein the participant list includes communication participants organized in one or more groups with respective displayed group names, wherein one or more messages are exchanged in the first messaging mode with the communication participants;

receiving, an indication to switch to a participant list in a second messaging mode different from the first messaging mode, the participant list in the second messaging mode including communication participants selected from participants with whom one or more messages are exchanged in the second messaging mode;

in response to receiving the indication to switch to the participant list in the second messaging mode, transforming the participant list from the first messaging mode to the second messaging mode, wherein the transforming comprises removing at least a first group of the one or more groups;

in response to the transforming, providing a control related to the second messaging mode that enables initiation of communication associated with participants of the participant list in the second messaging mode; and displaying the participant list in the second messaging mode, such that a group name of the first group is not displayed.

2. The computer-implemented method of claim 1, wherein the transforming further comprises adding a second group of communication participants that is not in the one or more groups, and wherein the participant list displayed in the second messaging mode includes a group name of the second group.

3. The computer-implemented method of claim 1, wherein transforming the participant list from the first messaging mode to the second messaging mode includes re-ordering the one or more groups.

4. The computer-implemented method of claim 1, further comprising:
   after displaying the participant list in the second messaging mode, receiving a second indication to switch back to the participant list in the first messaging mode; and
   in response to the second indication to switch back to the participant list in the first messaging mode,
      deactivating the control related to the second messaging mode; and
      displaying the participant list in the first messaging mode.

5. The computer-implemented method of claim 1, further comprising:
   receiving, an indication to switch to a participant list in a third messaging mode different from the first messaging mode and the second messaging mode, the participant list in the third messaging mode including communication participants selected from participants with whom one or more messages are exchanged in the third messaging mode; and
   in response to receiving the indication to switch to the participant list in the third messaging mode, transforming the participant list to the third messaging mode, wherein the participant list displayed in the third messaging mode includes a third group of communication participants that is excluded from the one or more groups.

6. The computer-implemented method of claim 1, wherein the control is not displayed in the first messaging mode, and wherein providing the control comprises displaying the control in the second messaging mode.

7. The computer-implemented method of claim 6, wherein the first messaging mode is a general messaging mode, the second messaging mode is related to electronic commerce, and wherein the control, when activated, enables display of a shopping cart.

8. A non-transitory computer-readable medium with instructions stored thereon that, when executed by a processor, cause the processor to perform operations comprising:
   displaying a participant list in a first messaging mode, wherein the participant list includes communication participants organized in one or more groups with respective displayed group names, wherein one or more messages are exchanged in the first messaging mode with the communication participants;
   receiving, an indication to switch to a participant list in a second messaging mode different from the first messaging mode, the participant list in the second messaging mode including communication participants selected from participants with whom one or more messages are exchanged in the second messaging mode;
   in response to receiving the indication to switch to the participant list in the second messaging mode, transforming the participant list from the first messaging mode to the second messaging mode, wherein the transforming comprises removing at least a first group of the one or more groups;
   in response to the transforming, providing a control related to the second messaging mode that enables initiation of communication associated with participants of the participant list in the second messaging mode; and
   displaying the participant list in the second messaging mode, such that a group name of the first group is not displayed.

9. The non-transitory computer-readable medium of claim 8, wherein the operation of transforming further comprises adding a second group of communication participants that is not in the one or more groups, and wherein the participant list displayed in the second messaging mode includes a group name of the second group.

10. The non-transitory computer-readable medium of claim 8, wherein transforming the participant list from the first messaging mode to the second messaging mode includes re-ordering the one or more groups.

11. The non-transitory computer-readable medium of claim 8 with further instructions stored thereon that, when executed by the processor, cause the processor to perform operations comprising:
   after displaying the participant list in the second messaging mode, receiving a second indication to switch back to the participant list in the first messaging mode; and
   in response to the second indication to switch back to the participant list in the first messaging mode,
      deactivating the control related to the second messaging mode; and
      displaying the participant list in the first messaging mode.

12. The non-transitory computer-readable medium of claim 8 with further instructions stored thereon that, when executed by the processor, cause the processor to perform operations comprising:
   receiving, an indication to switch to a participant list in a third messaging mode different from the first messaging mode and the second messaging mode, the participant list in the third messaging mode including communication participants selected from participants with whom one or more messages are exchanged in the third messaging mode; and in response to receiving the indication to switch to the participant list in the third messaging mode, transforming the participant list to the third messaging mode, wherein the participant list displayed in the third messaging mode includes a third group of communication participants that is excluded from the one or more groups.

13. The non-transitory computer-readable medium of claim 8, wherein the control is not displayed in the first messaging mode, and wherein providing the control comprises displaying the control in the second messaging mode.

14. The non-transitory computer-readable medium of claim 8, wherein the first messaging mode is a general messaging mode, the second messaging mode is related to electronic commerce, and wherein the control, when activated, enables display of a shopping cart.

15. A system comprising:
a memory; and
a processor coupled to the memory, the memory including one or more instructions that, when executed by the processor, cause the processor to perform operations comprising:
displaying a participant list in a first messaging mode, wherein the participant list includes communication participants organized in one or more groups with respective displayed group names, wherein one or more messages are exchanged in the first messaging mode with the communication participants;
receiving, an indication to switch to a participant list in a second messaging mode different from the first messaging mode, the participant list in the second messaging mode including communication participants selected from participants with whom one or more messages are exchanged in the second messaging mode;
in response to receiving the indication to switch to the participant list in the second messaging mode, transforming the participant list from the first messaging mode to the second messaging mode, wherein the transforming comprises removing at least a first group of the one or more groups;
in response to the transforming, providing a control related to the second messaging mode that enables initiation of communication associated with participants of the participant list in the second messaging mode; and
displaying the participant list in the second messaging mode, such that a group name of the first group is not displayed.

16. The system of claim 15, wherein the transforming further comprises adding a second group of communication participants that is not in the one or more groups, and wherein the participant list displayed in the second messaging mode includes a group name of the second group.

17. The system of claim 15, wherein transforming the participant list from the first messaging mode to the second messaging mode includes re-ordering the one or more groups.

18. The system of claim 15, wherein the one or more instructions cause the processor to perform further operations comprising:
after displaying the participant list in the second messaging mode, receiving a second indication to switch back to the participant list in the first messaging mode; and
in response to the second indication to switch back to the participant list in the first messaging mode,
deactivating the control related to the second messaging mode; and
displaying the participant list in the first messaging mode.

19. The system of claim 15, wherein the one or more instructions cause the processor to perform further operations comprising:
receiving, an indication to switch to a participant list in a third messaging mode different from the first messaging mode and the second messaging mode, the participant list in the third messaging mode including communication participants selected from participants with whom one or more messages are exchanged in the third messaging mode; and
in response to receiving the indication to switch to the participant list in the third messaging mode, transforming the participant list to the third messaging mode, wherein the participant list displayed in the third messaging mode includes a third group of communication participants that is excluded from the one or more groups.

20. The system of claim 15, wherein the control is not displayed in the first messaging mode, and wherein providing the control comprises displaying the control in the second messaging mode.

* * * * *